United States Patent [19]

Cary et al.

[11] 3,877,463

[45] Apr. 15, 1975

[54] THERMAL METHOD AND DEVICE FOR THE DIFFERENTIAL DIAGNOSIS OF HUMAN TUMORS AND CIRCULATORY DISORDERS

[75] Inventors: John D. Cary, Brookline; Borivoje B. Mikic, Cambridge, both of Mass.

[73] Assignee: Massachusetts Institute of Technology, Cambridge, Mass.

[22] Filed: July 2, 1973

[21] Appl. No.: 376,066

[52] U.S. Cl................................ 128/2 H; 73/15 R
[51] Int. Cl............................................. A61b 5/00
[58] Field of Search.... 128/2 H, 2 N, 2 R, 399–403; 73/341, 342, 190 R, 15 R, 15 A

[56] References Cited
UNITED STATES PATENTS

| | | | |
|---|---|---|---|
| 2,728,337 | 12/1955 | Guillemin, Jr. | 128/2 H |
| 2,769,334 | 11/1956 | Soehngen | 73/15 R |
| 2,951,360 | 9/1960 | Sampson et al. | 73/15 A |
| 2,982,132 | 5/1961 | Mendlowitz | 128/2 H |
| 3,533,397 | 10/1970 | Scher | 128/2 N |
| 3,618,590 | 11/1971 | Frank | 128/2 R |

FOREIGN PATENTS OR APPLICATIONS

| | | | |
|---|---|---|---|
| 127,358 | 11/1958 | U.S.S.R. | 128/2 N |
| 130,151 | 6/1959 | U.S.S.R. | 128/2 R |

OTHER PUBLICATIONS

Gundersen, "A Versatile Therm. Amp. for Recording of Temp.," Med. and Biol. Eng'r., Vol. 10, pp. 564–566, 1972.
"Tumor Temp. Monitoring...For Breast Cancer," Gillespie, Bio.-Med. Eng'r., Aug. 1971, pp. 358–362, Vol. 6, No. 8.

Primary Examiner—Richard A. Gaudet
Assistant Examiner—Lee S. Cohen
Attorney, Agent, or Firm—Arthur A. Smith, Jr.; Martin M. Santa; Anthony M. Lorusso

[57] ABSTRACT

The thermal analysis method includes controlled cooling of the surface of skin tissue and measurement of the surface temperature difference between cooled cancerous and similarly cooled healthy tissue.

The device which utilizes the effect of local skin cooling to diagnose the presence of tumors includes a heat sink, a thermal resistance which maximizes the skin temperature difference between cancerous and healthy tissue, and a heat collecting disk containing a temperature sensing device.

During diagnostic examinations, the heat collecting disk is placed upon an area of skin where a tumor is suspected and upon a contra-lateral area of normal skin. The skin temperature difference observed by use of the device indicates blood perfusion changes between the two areas, which for the identical cooling conditions used, reflects morphological changes in the tissue. Perfusion rate differences between cancerous and healthy tissue are indicated by skin temperature differences of up to 10°C under conditions of strong cooling. For small superficial tumors of 1 cm³ volume, temperature differences of a few degrees centigrade will be observed with strong cooling.

The method and device can also be used for the detection of various circulatory disorders.

22 Claims, 10 Drawing Figures

L ≡ AVERAGE PENETRATION DEPTH
L∞ ≡ PENETRATION DEPTH FOR INFINITELY LARGE DISK

L ≡ AVERAGE PENETRATION DEPTH
L∞ ≡ PENETRATION DEPTH FOR INFINITELY LARGE DEPTH

THERMAL METHOD AND DEVICE FOR THE DIFFERENTIAL DIAGNOSIS OF HUMAN TUMORS AND CIRCULATORY DISORDERS

The invention herein described was made in the course of work performed under a grant from the National Institutes of Health.

BACKGROUND OF THE INVENTION

The present invention relates to the diagnosis of tumors by measuring the temperature of skin tissue where tumors are suspected and comparing this temperature with a standard taken for normal tissue, which is usually at a contra-lateral position. As used throughout this specification and claims, the term "contralateral" postition is intended to represent a position of the body that is bi-laterally symmetrical to another position of the body. For example, the right ear is in a position in the human body contralateral to the left ear. A thermal method similar to the foregoing method of diagnosis for determining the presence of cancerous tumors is known. This known method is commonly referred to as infra-red thermography. Other methods for diagnosing the presence of tumors include mammography and xerography. Since mammography and xerography have well known disadvantages and bear little resemblence to the present method and device, they are not discussed further.

Infra-red thermography has been used with some success for the differential diagnosis of a variety of tumor masses which lie near to the skin surface. Such diagnoses are based upon differences in skin temperatures between cancerous and healthy tissue. Perhaps the most significant deficiencies associated with infrared thermography are the problems of interpreting marginal readings and the high cost associated with infra-red systems. Another deficiency of infra-red thermographic devices is that they are not operated in conjunction with any detailed analysis of thermal parameters. Indeed, infra-red thermography is not practiced in an efficient manner.

SUMMARY OF THE INVENTION

The deficiences of prior art methods and devices for detecting tumors are significantly reduced by the method and device of the present invention which utilizes a discovery that the skin temperature difference between cancerous and healthy tissue is determined for the most part by the perfusion rate of blood in the tissue and that perfusion rates through cancerous tissue can differ significantly from perfusion rates through healthy or normal tissue during conditions of moderate cooling. In accordance with the present invention, the temperature difference between cancerous and healthy tissue is enhanced by cooling small areas of tissue through a thermal resistance which maximizes the sensitivity of the method and devices for detecting the presence of tumors.

Accordingly, it is an object of the present invention to provide a new and improved method and device for the differential diagnosis of human tumors lying near to the skin's surface.

It is a further object of the present invention to provide a method and device for diagnosing the presence of tumors and circulatory disorders which is more economical than known prior art methods and devices.

It is a further object of the present invention to provide a method and device for diagnosing the presence of tumors which indirectly measures and compares the difference between the perfusion rate of healthy tissue and cancerous tissue.

It is a further object of the present invention to provide a device which can be used to cool the surface of cancerous tissue and measure the temperature of the tissue cooled so that the measured temperature can be compared to a standard.

A further object of the present invention is to provide a method and device with which temperature differentials between cancerous and normal tissue of a few degrees centigrade can be determined to diagnose the presence of tumors.

DESCRIPTION OF THE PREFERRED EMBODIMENTS

Figure 1:
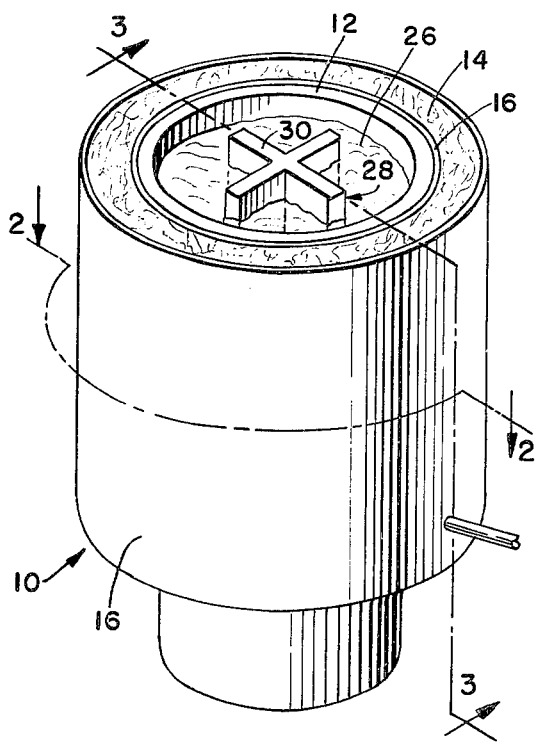
FIG. 1 is a perspective view of the device for measuring the skin temperature difference between cancerous and normal tissue.

At the outset, the method and device of the present invention is described in its broadest overall aspects with more detailed descriptions following. The present invention is based on the discovery that the skin temperature difference between cancerous and healthy tissue under conditions of cooling is mainly determined by the blood perfusion rate in the tissue and, most importantly, that the temperature difference may be enhanced by increasing the thermal interaction with the environment. Increasing the thermal interaction with the environment may be accomplished by either lowering the environmental temperature or by optimizing the surface heat transfer conditions.

In accordance with the present invention, localized cooling is employed which permits large temperature differences between cancerous and healthy tissues to be obtained without excessive heat loss from the patient. It should be noted that excessive heat loss can result in deleterious effects. For example, if heat loss is great, patient comfort is affected. Indeed, physiological responses, such as shivering, may be induced by large heat losses which are detrimental to the measurement procedure. It is for the foregoing reasons that the enhancement in temperature differences which can be achieved by infra-red thermography is limited. With the device and method of the present invention, the cooling area is small when compared to the area associated with infra-red thermographic methods.

At this point, it should be noted that the concept of localized thermal interaction with tissue is not new, but with previous analysis utilizing localized thermal interaction with the tissue, an understanding of the significance of the observed effects was not known.

As is stated above, the method and device of the present invention is predicated on the fact that the growth of human tumors is normally accompanied by changes in local blood perfusion and metabolic rates. In general, these changes affect temperature distributions in the vicinity of tumors. Thus, differential diagnoses of tumors can be made from observations on temperature fields around tumors and in corresponding (usually contra-lateral) healthy tissues. Prior to the present invention, temperature variations have been observed at the skin for superficial tumors, i.e., tumors at or below the skin. Indeed, prior to the present invention, breast cancer has been successfully diagnosed by observing "abnormal" thermal patterns at the skin.

In principle, the thermal patterns within tissue are affected not only by the perfusion and metabolic rates but also by the surface thermal conditions in the proximity of the region of interest. Thus, it is important to state the surface heat transfer conditions (i.e., cooling, heating, or insulation) under which the thermal pattern is observed.

To demonstrate the method of the present invention, the laboratory device as set forth in FIGS. 1–4 was constructed. At this point, it should be noted that the device shown in FIGS. 1–4 was constructed in the laboratory with parts that were readily available. The significance of the foregoing is that it should be readily apparent that modifications might be made on the device shown in FIGS. 1–4 when commercial instruments in accordance with the present invention are manufactured and sold. Thus, the description which follows relating to the device shown in FIGS. 1–4 is not intended to limit the invention in any way, but is offered primarily to show the advance in the art which has resulted from the present invention.

FIG. 1 is a perspective view of a device 10 in accordance with the present invention for measuring the perfusion rate of skin tissue. The purpose of the device is to cool an area of tissue to be diagnosed and to measure the temperature at the skin's surface after the tissue has been cooled. To accomplish the foregoing, device 10 is inclusive of a vessel 12 which can hold a quantity of ice and water which serves as a heat sink. Vessel 12 is insulated by a layer of urethane foam insulation 14 which has foil faces 16. Vessel 12 is water tight and is formed from an organic plastic material such as the material sold under the trade name Plexiglas.

Hermetically sealed to the bottom of vessel 12 is a heat collecting disk 18. It has been found advantageous to form a major portion of the volume of heat collecting disk 18 from copper since copper is a highly thermally conductive material which is available at a reasonable cost; however, other materials are suitable for forming a collecting disk. As will be apparent to those skilled in this art from the discussion which follows, the most important property for consideration in choosing a material for heat collecting disk 18 is the thermal conductivity of that material.

For the reasons which are explained in greater detail below, it has been found advantageous to thermally insulate the copper material which forms the central portion of heat collecting disk 18 from the copper on the outer portion of heat collecting disk 18. To accomplish the foregoing insulation, disk 18 is fabricated in three sections which include an outer ring 20 which is formed of copper, an insulating ring 22 which is formed of material such as Plexiglas plastic, and an inner disk 24 which is also formed of copper (see FIGS. 3 and 4). The foregoing sections may be held together by a friction fit or they may be glued to form a disk-like structure.

When device 10 is to be used to diagnose the presence of tumors, it is filled with ice water 26. To allow heat collecting disk 18 to conduct heat away from skin tissue toward the heat sink (ice water 26), device 10 is provided with a distributor 28. To increase thermal communication between ice bath 26 and collecting disk 18, distributor 28 includes an upper finned section 30 and a lower cylindrical section 32. It has been found advantageous to form distributor 28 out of aluminum because of the low weight and high conductivity associated with aluminum. As will be apparent to those skilled in this art, however, other materials and other components can be employed to provide the function of distributor 28 which is a means for increasing thermal communication between the heat collecting disk and the heat sink (ice bath 26) or as a means for transfering thermal energy between the cooling surface (collecting disk 18) and the heat sink.

The skin tissue being diagnosed is cooled to a temperature below the temperature which results when a patient is in a room at room temperature (20°C). At this point, it should be noted that if the heat collecting disk 18 were to contact distributor 28, the result would be unacceptable. The reason for this fact is that the thermal conductivity of copper and aluminum is so high that the skin being diagnosed would reach a temperature close to the temperature of the sink (ice bath). Therefore, in accordance with the present invention, skin being diagnosed is cooled through a resistance (R). In the device of FIGS. 1–4, that resistance (R) is the result of a separation and insulation between the bottom of cylindrical section 32 of distributor 28 and collecting disk 18. Although many materials and components are suitable for providing a resistance (R), it has been found advantageous to separate distributor 28 from collecting disk 18 with a spacer ring or collar 34 and to fill the chamber formed by the inner volume of the spacer ring with a spacer insulator 36 (see FIGS. 3 and 4). Because ice water is used as a heat sink, it is economical to use water as the spacer insulator material 36. One reason for using water is that its use as an insulator does not require a seal between the insulator material and ice bath. Thus, with water being used as the spacer insulator, only one hermetical or water tight seal is necessary in the device. As is set forth above, that seal is between the collecting disk 18 and the vessel 12. When water is used as an insulator, spun glass is inserted into the water gap as a baffle 33 to prevent natural convection. The spun glass or glass wool has a low volume fraction and does not contribute significantly to the effect of the resistance.

In the theoretical discussion which follows, the importance of providing a resistance between the heat collector and the heat sink is set forth. In that discussion, the effect of the value of the resistance is also set forth. At this point, however, it should be noted that the value of the resistance is proportional to the thickness of the resistance for resistances of constant radii. In the device shown in FIGS. 1-4, the resistance is proportional to the thickness of the water gap. Thus, with the device of FIGS. 1-4, the value of the resistance can be easily increased or decreased by changing the height of spacer ring or collar 34.

As is apparent from the foregoing, the ice bath 26 in vessel 12 will cool collecting disk 18 because thermal energy will flow from collecting disk 18 into the ice bath. Collecting disk 18 will in turn cool the skin tissue to which it is applied because heat will flow from the skin tissue into the heat collecting disk 18. Of course, blood flow in blood vessels within the cooled tissue will counteract the heat loss caused by the heat collecting disk 18. This blood flow or perfusion rate will vary according to whether or not the tissue is normal tissue or tissue containing tumors. Different perfusion rates between cancerous and normal tissues results in skin temperature readings which differ between cancerous and normal tissues.

Figure 3:
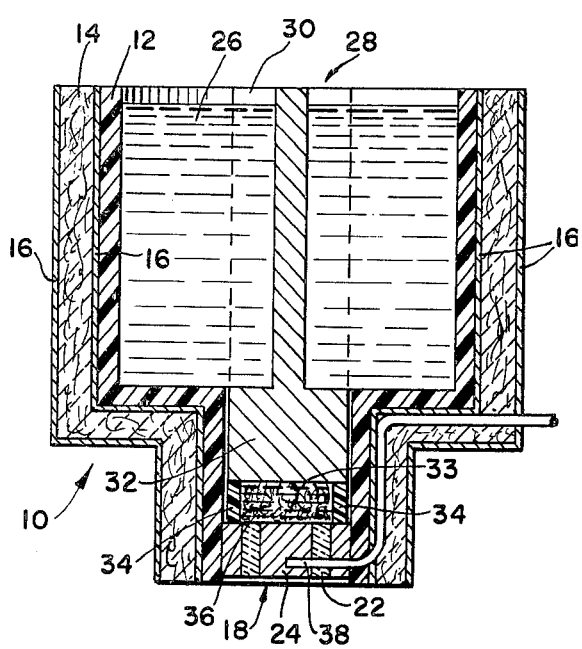
FIG. 3 is a vertical sectional view taken along line 3—3 of FIG. 1.
Figure 2:
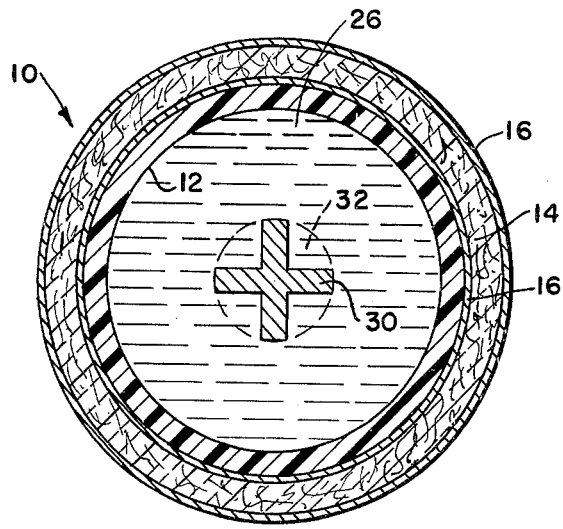
FIG. 2 is a horizontal sectional view taken along line 2—2 of FIG. 1.

As is best shown in FIG. 3, collecting disk 18 is provided with a thermistor 38. The temperature of the disk 18 which approximately equals skin temperature ($T_{skin}$) is thus measured with the thermistor 38.

During fabrication of device 10, thermistor 38 is introduced into collecting disk 18 through a bore applied for that purpose. Thermistor 38 is placed within inner disk 24 so that temperatures can be measured from that portion of collecting disk 18. The thermistor 38 is connected to a meter or read out (not shown). It has been found advantageous to use a digital type read out which measures temperatures to 1/10 of 1°C. At this point, it should be noted that other temperature measuring schemes can be used in the device of the present invention such as, for example, a thermocouple. These features, however, are well understood by those in this art.

The overall dimensions of the device shown in FIGS. 1-4 are as follows. The overall vertical height of device 10 from the bottom of heat collecting disk 18 to the top of vessel 12 is 10.2 cm. The outside diameter of the upper part of vessel 12 is 7.75 cm. The outside diameter of collecting disk 18 is 2.54 cm. Device 10 when filled with ice water weights about one-half kilogram. About ten minutes is required to reach thermal equilibrium with the tissue being diagnosed. Device 10 can be operated for about 30 minutes without requiring replacement of the heat sink (ice bath).

A theoretical discussion of the present invention has been presented in two papers at the Second International Symposium on Cancer Detection and Prevention in Bologna, Italy, on Apr. 9–12, 1973. The papers are entitled "A New Thermal Method for the Differential Diagnosis of Human Tumors" by John Cary, Borivoje Mikic and Richard Johnson and "A Thermal Analysis of Human Tissue with Applications to Thermography" by John Cary and Borivoje Mikic. The teachings of the foregoing two papers are incorporated herein by reference. The foregoing papers are available to the public on request by writing to:

Cesare Maltoni, Secretary General International Study Group on Detection and Prevention of Cancer Secretariat: Instituto di Oncologia "F Addarii" Viale Ercolani 4/2 40138 Bologna, Italy The important teachings of the foregoing publications appear in the theoretical discussion below.

Figure 5:
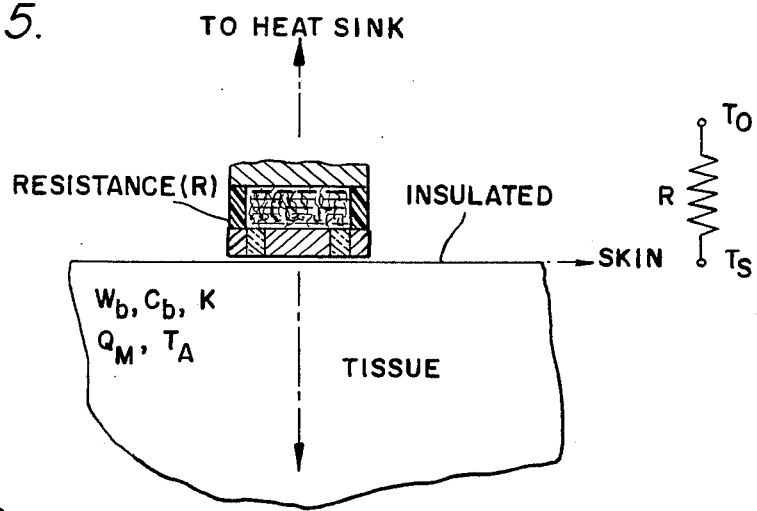
FIG. 5 is a schematic diagram illustrating local cooling of the section of skin tissue with an isothermal heat collecting disk in accordance with the present invention.

The theory upon which the method and device of the present invention is based is set forth below and is illustrated in FIG. 5 where a disk of radius, a, and uniform temperature, $T_S$, in contact with the skin is shown. The disk is assumed to be at a uniform temperature and is made of highly thermally conductivity material such as copper. The temperature of the disk (and of the skin, also, since the skin and the disk are in intimate contact) is:

$$T_S = T_A - (T_A - T_0) \frac{1}{1 + \frac{Rk}{a}\left(\frac{a\lambda}{I}\right)} + \frac{Q_M}{W_b C_b} \frac{\frac{Rk}{a}\left(\frac{a\lambda}{I}\right)}{1 + \frac{Rk}{a}\left(\frac{a\lambda}{I}\right)} \quad (1)$$

where R is the thermal resistance between the heat sink (at temperature $T_0$) and the disk (at temperature $T_S$), $T_A$ is the arterial blood temperature, k is the tissue thermal conductivity, $W_b$ is the blood perfusion rate, $C_b$ is the specific heat of blood, and $Q_M$ is the metabolic heat generation. In the c.g.s. system, R has the units [cm$^2$sec°C/cal], T [°C], k [cal/cm/sec/°C], $w_b$ [gm/cm$^3$/sec], $c_b$ [cal/gm/°C], $Q_M$ [cal/cm$^3$/sec], and a [cm]. Also, $\lambda = \sqrt{w_b c_b/k}$. I, a dimensionless function of a and $\lambda$, is a derived integral. $\lambda$ has units [cm$^{-1}$] and 1/$\lambda$ and may be thought of as a characteristic thermal distance. Although $\lambda$ is proportional to $\sqrt{w_b}$, it is used interchangeably with perfusion rate. Rk/a and a$\lambda$ are dimensionless groups which make it convenient to analyze the problem in general terms. R and a are the variables of interest which are characteristic of the device of the present invention.

Figure 6:
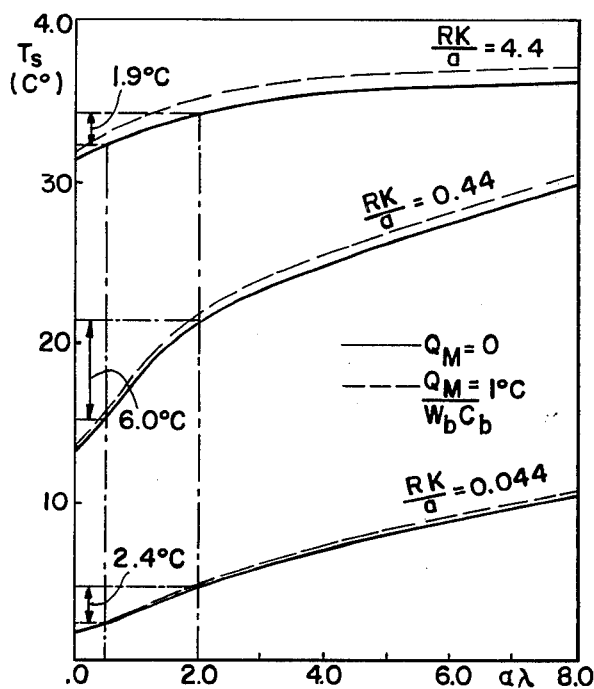
FIG. 6 is a graph showing the temperature of skin subjected to local cooling with a heat collecting disk of radius a in accordance with the present invention.

FIG. 6 shows $T_S$ as a function of perfusion rate, assuming $Q_M/w_b c_b$ is constant for a given tissue. This is probably a better assumption for healthy tissues, where oxygen demand can have auroregulatory control over local perfusion than for tumors, for which the mechanisms are not as well understood. However, during an ongoing study of the vascular states of tumors undergoing radiation therapy, it was discovered that the adiabatic tumor temperature was never more than 1°C above mouth temperature. From this fact, it was estimated that $Q_M/w_b c_b$ is on the order of 1°C or less. Moreover, since $T_A - T_0$ is much greater than one, $Q_M/[w_b c_b (T_A - T_0)]$ is much less than one. Therefore, the results are not strongly affected by the assumption, and, in fact, under the cooling conditions used, one does not introduce significant error by neglecting the effect of metabolism altogether.

In view of the foregoing, a typical system utilizing ice water for its heat sink was considered and its response examined in terms of perfusion rates and thermal resistance. Under conditions of cooling, mainly due to the lack of vasoconstriction mechanisms in tumors, the perfusion rates in healthy tissues can be considerably less than in tumors. Indeed, perfusion rates measured with a local cooling method indicated, for example, that in tumors, $\lambda_T = 2$ cm$^{-1}$ and in healthy tissue, $\lambda_N = 0.5$ cm$^{-1}$. (Here, T = tumor, and N = normal or healthy.)

If the radius of the disk of a typical system is 1 cm, it is possible to calculate the response of the device. For example, if the perfusion rates in the cancerous and healthy tissue are as described above, then $a\lambda_N = 0.5$ and $a\lambda_T = 2$. From FIG. 6 it is seen that the temperature difference which would be observed when the disk is placed first on cancerous and then on healthy tissue, it is very much dependent upon the value of the thermal resistance, R, which controls the heat flow from the skin to the heat sink. For Rk/a = 0.44, the skin temperature difference, $\Delta T_S$, is 6°C, while if Rk/a = 0.044 or 4.4, the temperature difference is only about 2°C. It is evident that there exists an optimum thermal resistance for which one would obtain a maximum temperature, $\Delta T_S$, between cancerous and healthy tissue.

An expression for the optimum value of R, which induces the maximum skin temperature difference between healthy and cancerous tissue, was derived as follows:

$$R_{opt} = \frac{1}{k} \sqrt{\frac{I(a\lambda_N)I(a\lambda_T)}{\lambda_T \lambda_N}} \quad (2)$$

Figure 7:
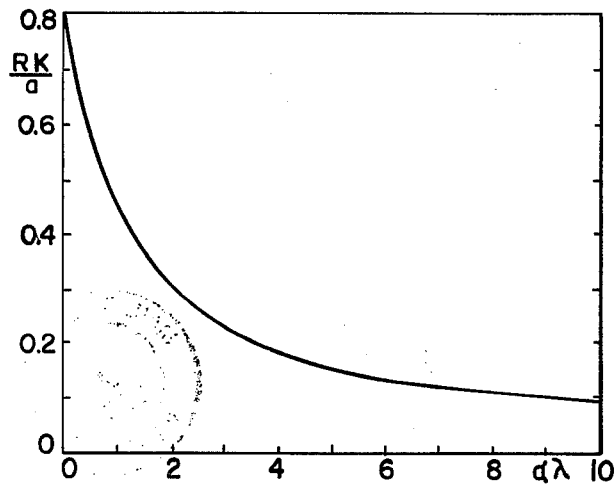
FIG. 7 is a graph showing the value for an optimum resistance (dimensionless) in accordance with the present invention.

Equation (2) is plotted (in dimensionless form) in FIG. 7 for differential changes in the perfusion rate. A good aproximation is to let $\lambda = \sqrt{\lambda_T \lambda_N}$ and evaluate $R_{opt}$ from FIG. 7. If R is within a factor of two of $R_{opt}$, the temperature difference obtained will not be much less than the maximum. It can be shown that $(Rk/a)_{opt} = 0.44$ for the previous example; thus, the 6°C temperature difference obtained is the absolute maximum for those assumed perfusion rates and a radius of 1 cm.

Figure 8:
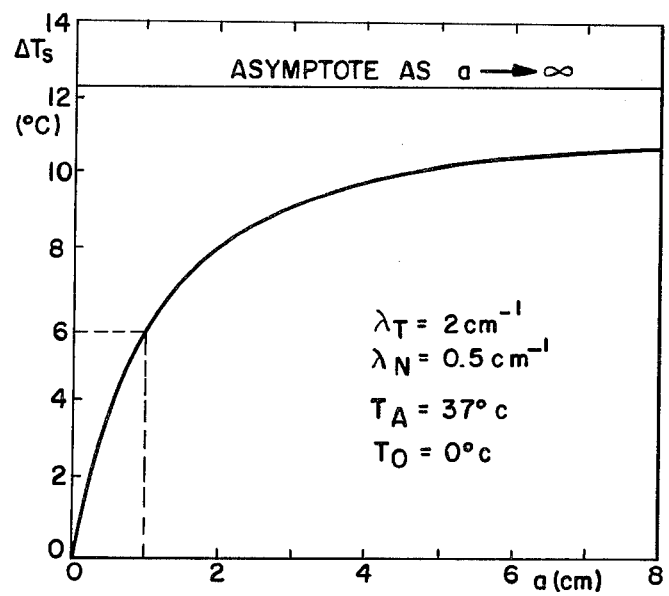
FIG. 8 is a graph showing the affect of the radius of a heat collecting disk on the sensitivity of a device in accordance with the present invention.

For a heat sink temperature of 0°C, the maximum temperature difference which can be induced between cancerous and healthy tissue (with the assumed perfusion rates $\lambda_T = 2$ cm$^{-1}$ and $\lambda_N = 0.5$ cm$^{-1}$) is 12.3°C. Thus, a disk of radius 1 cm is only about 50 percent as sensitive as the theoretical maximum. The loss in sensitivity is due to the small disk size. FIG. 8 shows that as the disk radius goes to infinity, the sensitivity of the device approaches the theoretical maximum; for small disks (radii less than 1 cm), the sensitivity falls towards zero very rapidly.

Figure 9:
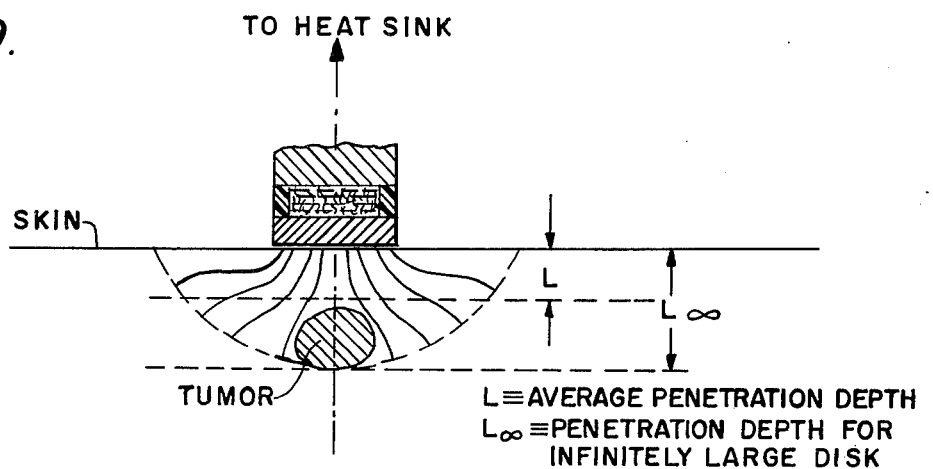
FIG. 9 is a schematic diagram showing the penetration region for a one-piece heat collecting disk in accordance with the present invention.

The loss of sensitivity (for this particular example) is not very crucial since the 6°C temperature difference which would be obtained is still much greater than that normally obtained in thermography. However, for small differences in the perfusion rate between healthy and cancerous tissue, or for tumors separated from the surface by a layer of normal tissue, the loss of sensitivity due to the small disk radius would be substantial. This loss is caused by a reduction in the penetration depth (e.g., the depth from where heat energy originates which flows into the disk). The concept of penetration depth is illustrated in FIG. 9. Furthermore, for a small tumor within the region of penetration, the contribution to the overall heat flowing from the tumor through the disk is small; thus, the sensitivity of the disk to small tumors will be small.

Figure 10:
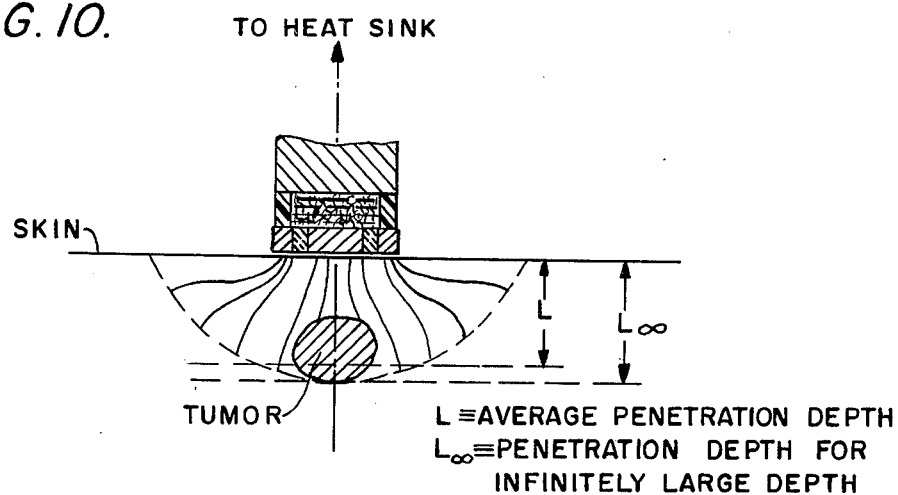
FIG. 10 is a schematic diagram showing the penetration region for a three-piece heat collecting disk in accordance with the present invention.

The concept of penetration depth suggests as large a disk as is possible, but the inability to detect small tumors, and the drawback of large heat loss from the patient for large disks, favors the opposite. However, it is clear that (1) the center of the disk in FIG. 9 has a penetration depth which is near that of the maximum penetration depth (for very large disk radii) and which is much larger than the average penetration depth, and (2) the heat that flows through this center portion comes from a small region. Hence, if the center part of the disk is thermally insulated from the outer annulus, then the center portion of the disk will have a penetration depth as if it were very large, but it will also be sensitive to small tumors since the heat which comes to the center portion comes from a small region. The foregoing is illustrated in FIG. 10. For the foregoing reasons, the heat collecting disk 18 (see FIGS. 3 and 4) was made with an insulated center portion 22, and the temperature is measured there, independent of the outer annulus or ring 20.

Figure 4:
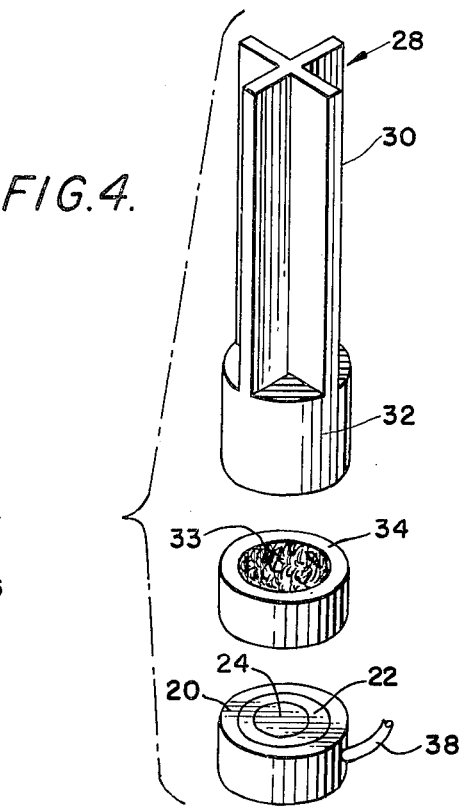
FIG. 4 is an exploded perspective view of a heat collecting disk, spacer, baffle and finned distributor of the temperature measuring device in accordance with the present invention.

In the laboratory device which was constructed in accordance with the present invention and which included the three-piece heat collecting disk shown in FIGS. 3 and 4, the outside diameter of outer ring 20 was approximately 2.54 cm. The diameter of inner disk 24 was approximately 1.00 cm. Inner disk 24 was separated from outer ring 20 by insulating ring 22 which was approximately 0.26 cm thick. Thus, the outside diameter of insulating ring 22 was approximately 1.52 cm.

EXPERIMENTAL RESULTS

Operating procedure is to place the device on the skin over a suspected tumor (determined either by palpation, thermography, mammography, or some other means) and then on a symmetric normal area. (Of course, two identical instruments could be used simultaneously.) When the steady-state is reached, after five to ten minutes, the heat collecting disk (i.e., skin) temperatures are recorded. The diagnosis is based on the difference between these two readings, the same as for thermography.

The proper value for R (i.e., the water gap thickness) can be determined in a number of ways. One way is to adjust the value of R when the device is in contact with normal tissue so that the steady-state temperature is about 15°C. Another is, of course, from experience. A third way is to set the water gap thickness equal to [(conductivity of water)/k] cm.

Experimental evidence has been compiled from perfusion measurements on tumors undergoing radiation therapy. From these observations, the response of a relatively insensitive one-piece disk was calculated (see Table 1). Over 6°C temperature difference can be obtained with large tumors. A small parathyroid tumor would be 1.2°C difference between the region directly over the tumor and contra-lateral normal tissue.

Calculations for the device of FIGS. 1–4 with the threepiece disk 18 (i.e., thermally insulated center portion 22) indicate that large tumors with similar perfusion rates will yield more than 10°C temperature difference, and small tumors within the region of penetration could show temperature differences of a few degrees centigrade.

TABLE 1

Temperature Differences Calculated
From Perfusion Measurements Between
Cancerous and Healthy Tissue Before and During
Radiation Therapy (One-Piece Disk, Radius = 1.5 cm)

| Tumor Location | Tumor Size | Skin Temperature Difference |
| --- | --- | --- |
| Groin | 100 cm$^3$ | 8.0°C |
| Breast | 120 | 4.1 |
| | do. | 7.2 |
| | do. | 6.2 |
| | do. | 8.4 |
| | 75 | 4.4 |
| | do. | 7.6 |
| | do. | 5.1 |
| | do. | 5.4 |
| | do. | 5.6 |
| | 40 | 3.0 |
| | do. | 5.5 |
| | do. | 6.3 |
| | do. | 6.2 |
| | 18 | 7.6 |
| Neck | 30 | 1.0 |
| | | 1.1 |
| Parathyroid | 1 (?) | 1.2 |

In accordance with the objects of the present invention, a new and improved thermal method and device for the differential diagnosis of human tumors has been achieved. The device of the present invention maximizes skin temperature differences between cancerous and healthy tissue. The new device, in accordance with the present invention, includes a heat sink, a thermal resistance, a small heat collecting surface which can touch and cool a patient's skin and a means for measuring the temperature of the cooled skin.

By following the teachings of the present invention, surface temperature changes of superficial tissue due to blood perfusion changes can be substantially increased to facilitate diagnosing the presence of cancerous tissue or circulatory disorders.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A device for determining the perfusion rate of superficial skin tissue by measuring the temperature of skin after the superficial tissue has been cooled below its normal temperature comprising:

a flat heat collecting surface having a defined area which can be placed in thermal communication with the skin and enable heat transfer from the skin to said heat collecting surface;

a heat sink means for cooling said heat collecting surface to enable the superficial tissue to be cooled below its normal temperature when said heat collecting surface is placed in thermal communication with the skin;

a thermal resistance connected between said heat collecting surface and said heat sink means including spacer means for defining the height of said thermal resistance, said heat sink means cooling said heat collecting surface through said thermal resistance to a temperature above the value of the heat sink means at steady state; and, means for measuring the temperature of skin when cooled by said surface, the device being designed so that the value of the thermal resistance, the heat sink means temperature, and the area of the heat collecting surface maximize the skin temperature difference for different perfusion rates.

2. The device as set forth in claim 1 wherein said means for measuring the temperature of skin tissue is a temperature sensing device within the said heat collecting disc having means for connecting said temperature sensing device to a means for displaying the temperature.

3. The device as set forth in claim 2 wherein said temperature sensing device is a thermocouple.

4. The device as set forth in claim 2 wherein said temperature sensing device is a thermistor.

5. A device for diagnosing tumors and circulatory disorders by determining the perfusion rate of superficial skin tissue by measuring the temperature of skin after the superficial tissue has been cooled below its normal temperature comprising:

a flat heat collecting surface having a defined area which can be placed in thermal communication with the skin and enable heat transfer from the skin to said heat collecting surface;

a vessel for containing a coolant which functions as a heat sink for cooling said heat collecting surface to enable the superficial tissue to be cooled below its normal temperature when said heat collecting surface is placed in thermal communication with the skin;

a coolant in said vessel;

a thermal resistance in the heat flow path between said heat collecting surface and said coolant including spacer means for defining the height of said thermal resistance, said coolant cooling said heat collecting surface through said thermal resistance to a steady state temperature above the temperature of the coolant; and, means for measuring the temperature of skin when cooled by said surface, the device being designed so that the value of the thermal resistance, the heat sink temperature, and the area of the heat collecting surface maximize the skin temperature difference for different perfusion rates.

6. The device as set forth in claim 5 wherein said means for measuring the temperature of skin tissue is a temperature sensing device within the said heat collecting disc having means for connecting said temperature sensing device to a means for displaying the temperature.

7. The device as set forth in claim 6 wherein said temperature sensing device is a thermocouple.

8. The device as set forth in claim 6 wherein said temperature sensing device is a thermistor.

9. The device as set forth in claim 6 also including a heat distributor in thermal communication with said resistance and said coolant.

10. The device as set forth in claim 9 wherein said heat collecting disc contains copper.

11. The device as set forth in claim 6 wherein said heat collecting disc is inclusive of a heat conducting inner disc, an outer ring of a heat conducting material and an insulating ring between said outer ring and said inner disc, With the temperature sensing device being positioned within said inner disc to maximize the penetration depth of said heat collecting surface while maximizing the device's sensitivity to small tumors.

12. A device for diagnosing tumors and circulatory disorders by determining the perfusion rate of superficial skin tissues by measuring the temperature of skin after the superficial tissue has been cooled below its normal temperature comprising:

a heat collecting disc having a flat heat collecting surface having a defined area which can be placed in thermal communication with the skin and enable heat transfer from the skin to said heat colleting surface;

a vessel for containing a coolant which functions as a heat sink for cooling said heat collecting surface to enable the superficial tissue to be cooled below its normal temperature when said heat collecting surface is placed in thermal communication with the skin;

a coolant in said vessel;

a heat distributor in thermal communication with said coolant;

a spacer ring between said heat distributor and said heat collecting disc, said spacer ring defining the height of a column of liquid between said heat distributor and said heat collecting disc to provide a thermal resistance in the heat flow path between said heat collecting surface and said coolant, said coolant cooling said heat collecting surface through said thermal resistance to a steady state temperature above the temperature of the coolant; and, means for measuring the temperature of skin when cooled by said surface, the device being designed so that the value of the thermal resistance, the heat sink temperature, and the area of the heat collecting surface maximize the skin temperature difference for different perfusion rates.

13. The device as set forth in claim 12 wherein the coolant is ice water and said spacer ring defines a column of water.

14. The device as set forth in claim 13 wherein said spacer ring is dimensioned to result in a resistance such that the equilibrium temperature of normal tissue cooled with said device is approximately 15°C.

15. The device as set forth in claim 14 wherein said heat collecting disc is inclusive of a heat conducting inner disc, an outer ring of a heat conducting material and an insulating ring between said outer ring and said inner disc, said inner disc, insulating ring and outer ring being in thermal communication with said thermal resistance.

16. The device as set forth in claim 15 wherein said means for measuring the temperature of skin tissue is a temperature sensing device located in said inner disc.

17. The device as set forth in claim 16 wherein said inner disc is formed of copper.

18. The device as set forth in claim 17 wherein said temperature sensing device is a thermistor.

19. The device as set forth in claim 18 wherein said outer ring is formed of copper.

20. A method for diagnosing the presence of human tumors and circulatory disorders comprising the following steps:

A. applying a flat cooling surface to the skin to be diagnosed and cooling the skin through a thermal resistance of a known value which is in thermal communication with a heat sink at a known constant temperature to a steady state temperature below normal skin temperature and above the temperature of the heat sink.

B. measuring the temperature of the skin cooled in Step A after a temperature equilibrium is reached between the skin and the cooling surface; and C. comparing the temperature of the skin measured in Step B with a standard to determine the presence of tumors or circulatory disorders beneath the skin by comparing the perfusion rates which are deduced from the cooled skin temperature, the sink temperature and the value of the thermal resistance.

21. The method as set forth in claim 1 wherein the temperature of the skin is measured in Step B by measuring the temperature of the cooling surface.

22. The method as set forth in claim 21 wherein in Step A the skin is cooled to a temperature of about 15°C.

* * * * *